United States Patent [19]

Washino

[11] Patent Number: 5,325,202

[45] Date of Patent: Jun. 28, 1994

[54] VIDEO FIELD-PRODUCTION CAMERA CONTROL SYSTEM

[76] Inventor: Kinya Washino, 80 Hamilton Ave., Dumont, N.J. 07624

[21] Appl. No.: 45,255

[22] Filed: Apr. 13, 1993

[51] Int. Cl.$^5$ ............................................. H04N 5/262
[52] U.S. Cl. ................................ 348/222; 3484/373; 3484/705; 3484/722; 3484/372
[58] Field of Search ................. 358/185, 149, 160, 86, 358/181, 210, 83, 335, 86; H04N 5/08, 5/262, 5/14

[56] References Cited

U.S. PATENT DOCUMENTS

| | | | |
|---|---|---|---|
| 3,258,531 | 6/1966 | Reindl et al. | 358/210 |
| 4,148,069 | 4/1979 | Smiley et al. | 358/160 |
| 4,180,829 | 12/1979 | Pires | 358/10 |
| 4,218,709 | 8/1980 | Baxter et al. | 358/181 |
| 4,700,230 | 10/1987 | Pshtissky et al. | 358/181 |

FOREIGN PATENT DOCUMENTS 0004671  1/1982  Japan ............................. H04N 5/26

OTHER PUBLICATIONS

Robinson, "The Video Primer", 1983 p. 235, 267, 268 and 350.

Future Productions Inc. "Breakthrough in Video Production and Duplication".
3-Chip CCD Studio/OB Color Camera System BVP-370, BVP 270.
3-Chip CCD Portable Color Camera BVP-70/70P.

*Primary Examiner*—Victor R. Kostak
*Assistant Examiner*—Nathan J. Flynn
*Attorney, Agent, or Firm*—Krass & Young

[57] ABSTRACT

A video field-production control system is adapted for use with video cameras supplied by various manufacturers, including cameras that utilize cable-oriented remote-control units associated with electronic news gatherings (ENG). An industry standard mounting frame holds a central control unit with interface modules dedicated to each camera to be used by the system, as well as a power supply, master synchronization generator and production switcher, all common to each installed interface module. In addition to providing customized connecters and cables to the attached equipment, each module provides for cable compensation and gain adjustment of composite and component video signals from the camera to the switcher plus phase adjustment of the master sync signal to the camera through an adapter further capable of providing the voltages necessary to power the camera.

17 Claims, 4 Drawing Sheets

VIDEO FIELD-PRODUCTION CAMERA CONTROL SYSTEM

FIELD OF THE INVENTION

This invention relates generally to systems employed to coordinate video cameras and related equipment during remote-site productions and, in particular, to a video field-production control system that takes advantage of the remote-control units supplied with video cameras from various manufacturers.

BACKGROUND OF THE INVENTION

In the business of video electronic field production (EFP), it is not uncommon to use a variety of video cameras and related equipment from various manufacturers at a remote site. Typically one or more operators use remote controls from a central production console to facilitate the management of the various camera shots.

Although camera manufacturers generally offer remote control units for their own equipment, integration of these controls is difficult because of the differences in their physical and electrical configurations. For example, the various cameras may require different power supply voltages to operate. Additionally, the more economical remote units supplied by the camera manufacturers, in particular, the ENG-type or electronic news gathering camera controllers are unsuitable for such remote production applications because they do not provide for long length cable compensation. Typically, the cables between the camera and its supplied remote are limited to a distance of 100 feet or less. Moreover, these ENG-type controllers do not have the requisite provisions for sync-phase and color-phase adjustments demanded by multi-camera configurations.

At the same time, more sophisticated Universal camera controllers are available which can coordinate video equipment during field production, including the direct control of cameras without the need for their supplied remote units, but the size and cost of these more complex units are often prohibitive to the small and medium video production house. As such, there remains a need for a "universal" type of camera-control unit, that fills the gap between incompatible remotes supplied by camera manufacturers and the more expensive and sophisticated general purpose field production units. Such a controller would be fully compatible with the remote control units supplied by the camera manufacturers, yet overcome the obstacles relating to overall cooperation, synchronization, cable-length compensation and packaging.

SUMMARY OF THE INVENTION

The present invention fills the gap previously delineated by providing a universal type of camera control unit for video field production that takes advantage of the camera manufacturer's own full-feature camera control units, enclosing these and other necessary components in a convenient, modular unit that can be adapted to provide standardized and uniform control to the operator. In particular, the system integrates cameras of diverse manufacturers and utilizes the more economical ENG-type remote units, thereby providing protection from system obsolescence.

The system of the present invention includes a mounting frame with a power supply, a master sync generator, a production switcher and a central control unit with modules, adapters and custom cables associated with each camera and its remote-control unit. The central control unit is designed to accommodate several of these modules, each module being operative to route power from the common power supply to the camera through an adapter specified for that camera, adjust the phase of the master synchronization signal in accordance with an operator control and route the adjusted signal to the camera through the adapter. The system is also adapted to receive video signals from the camera through the adapter, adjust for cable compensation and gain in accordance with an operator control, and route the adjusted video signal to the production switcher.

The system is capable of accommodating both composite and component video signals, with connectors, cable compensation and gain circuitry for each video signal from the camera to the switcher. In the preferred embodiment, connectors are provided for composite and Y, (R-Y), and (B-Y) component signals; however, the invention is equally applicable to alternative component systems, including RGB, YIQ (the NTSC system), YUV (the PAL system), $YD_R D_B$ (the SECAM), as well as high-definition systems.

If a particular camera requires specialized voltages, the common power supply voltage fed to the camera is converted first by the adapter into the required voltages, whether positive or negative. The system also provides connectors for a video tape recorder dedicated to a particular camera, an intercom connection, a tally light with associated connectors and cabling to indicate which module and accompanying camera have been selected by an operator using the switcher.

Specific features and advantages of the present system will now be described in detail, this detailed description making reference to the following figures.

DETAILED DESCRIPTION OF THE PREFERRED EMBODIMENT

The present invention is a video field-production control system that allows video cameras and related equipment from diverse manufacturers to be controlled remotely from a central location. The invention allows the use of ENG-type controllers supplied by the video camera manufacturers by providing a drawer-like shelf to hold these controllers within the framework. The physical mounting provisions follow an industry-standard configuration. The result is a system that provides all of the features and capabilities of a more sophisticated full-specification studio-type camera control unit, but at a much more economical cost.

Figure 1:
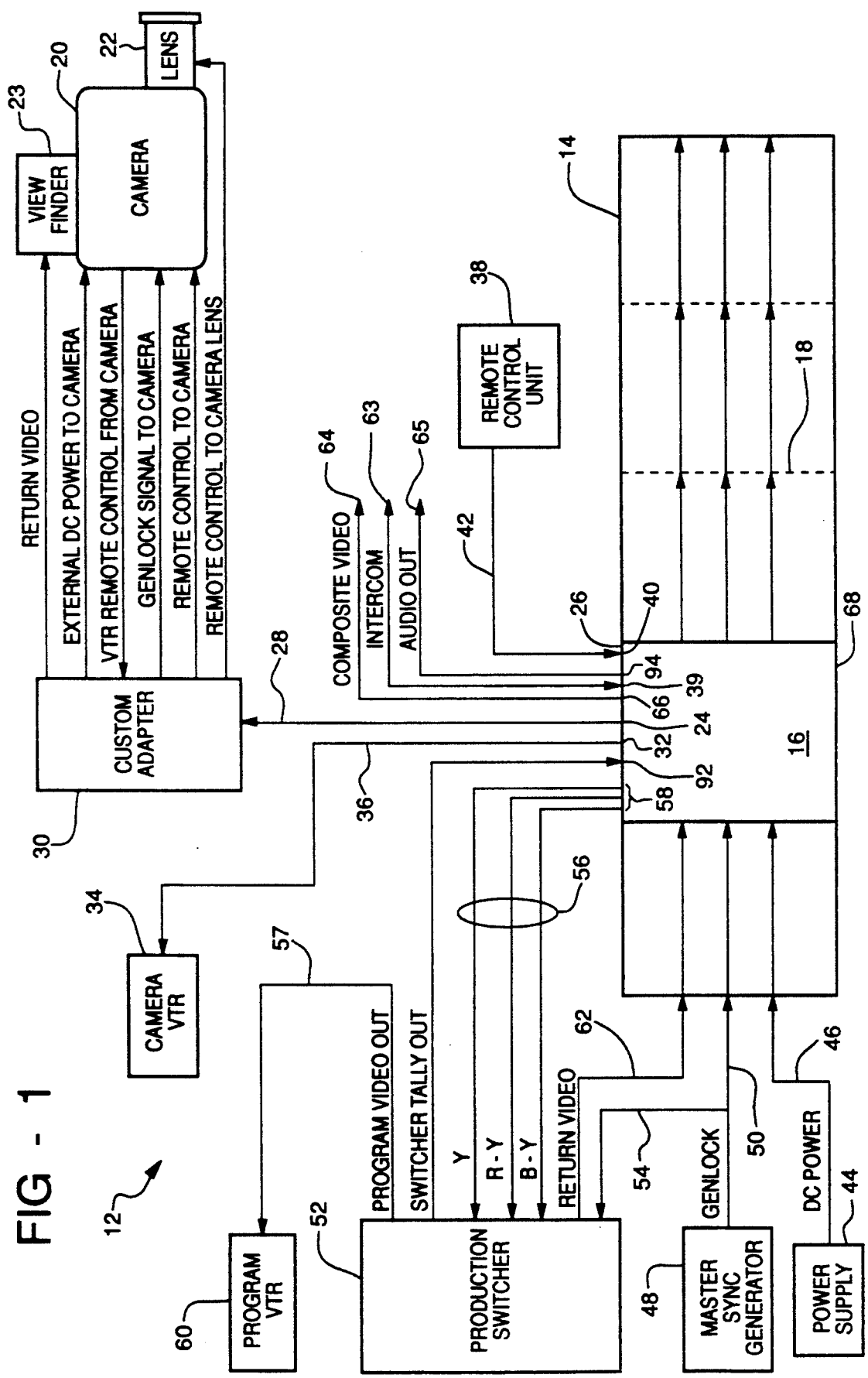
FIG. 1 is a block diagram of the system showing connections made to a single module.

Referring now to FIG. 1, the system, indicated generally at 12, includes a central control unit 14 and interface module 16, though the central unit 14 may accommodate a plurality of such modules, as indicated by broken lines 18. In the preferred embodiment, central unit 14 is provided with a chassis onto which five modules may be installed.

A video camera 20 having a lens 22 and viewfinder/monitor 23 attaches to a multiple contact connector 24 disposed on a rear panel 26 of module 16. A cable 28 interfaces to an adapter 30, the cable and adapter being customized for a camera 20 from a particular manufacturer. The cable and adapter are used to carry power, synchronization and control signals to the camera and to carry video, audio and status signals from the camera to the module. These signals will be described in greater detail with reference to FIGS. 2 through 4.

Another connector 32, disposed on rear panel 26 of module 16 may be attached to a video tape recorder 34 via cable 36, if it is desired to have a recording unit dedicated to the camera associated with a particular module. In an alternative embodiment the separate camera and VTR units may be replaced with a camcorder in which the camera and VTR are integrated into a single unit.

The remote-control unit 38 supplied by the manufacturer of camera 20 connects to connecter 40 on panel 26 of module 16 through a custom cable 42. A drawer-like shelf (not shown) serves to hold these remote control units below the central control unit 14 disposed on its mounting frame.

The system includes a power supply 44 which feeds the required DC voltages along line 46, preferably including a 48-volt signal, to power cameras, lenses, and viewfinder/monitors, plus appropriate voltages as required to power all modules installed in central unit 14. A master synchronization generator 48, also common to all modules, supplies a master sync or GENLOCK signal along line 50, as well to a production switcher 52 via line 54.

Production switcher 52 receives component video signals along lines 56, from separate connectors 58 on rear panel 26 of module 16. These component video signals include a Y signal, R-Y and B-Y signal, having been compensated and amplified within module 16, a process which will be described in detail with reference to FIG. 2.

The production switcher, under operator control, selects which video camera will be activated at a given time and produces a video out signal along line 57 to an attached video tape recorder unit 60. The switcher also provides a video out signal along line 62 common to all modules, enabling an operator utilizing a remote camera 20 to see the signal that is being recorded. Module 16 also provides a composite video signal 64 from the camera 20 through a separate connector 66 in the event that an application cannot take advantage of the component signals. Operator controls for module 16 are disposed on a front panel 68 which will be described in more detail with reference to FIG. 3.

Figure 2A:
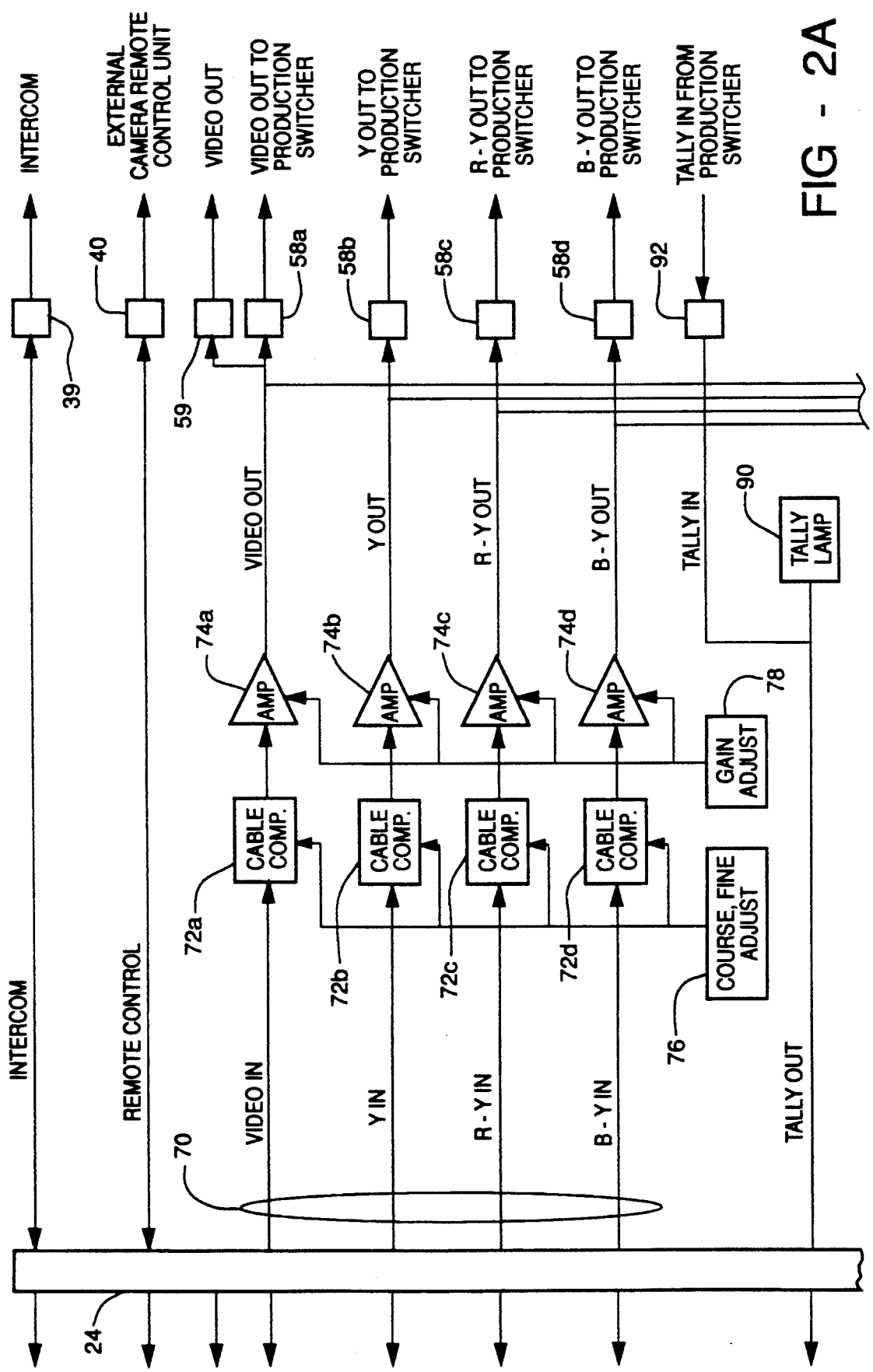
FIGS. 2A and 2B are schematic diagrams used to illustrate the electrical components and wiring within one of the modules.
Figure 2B:
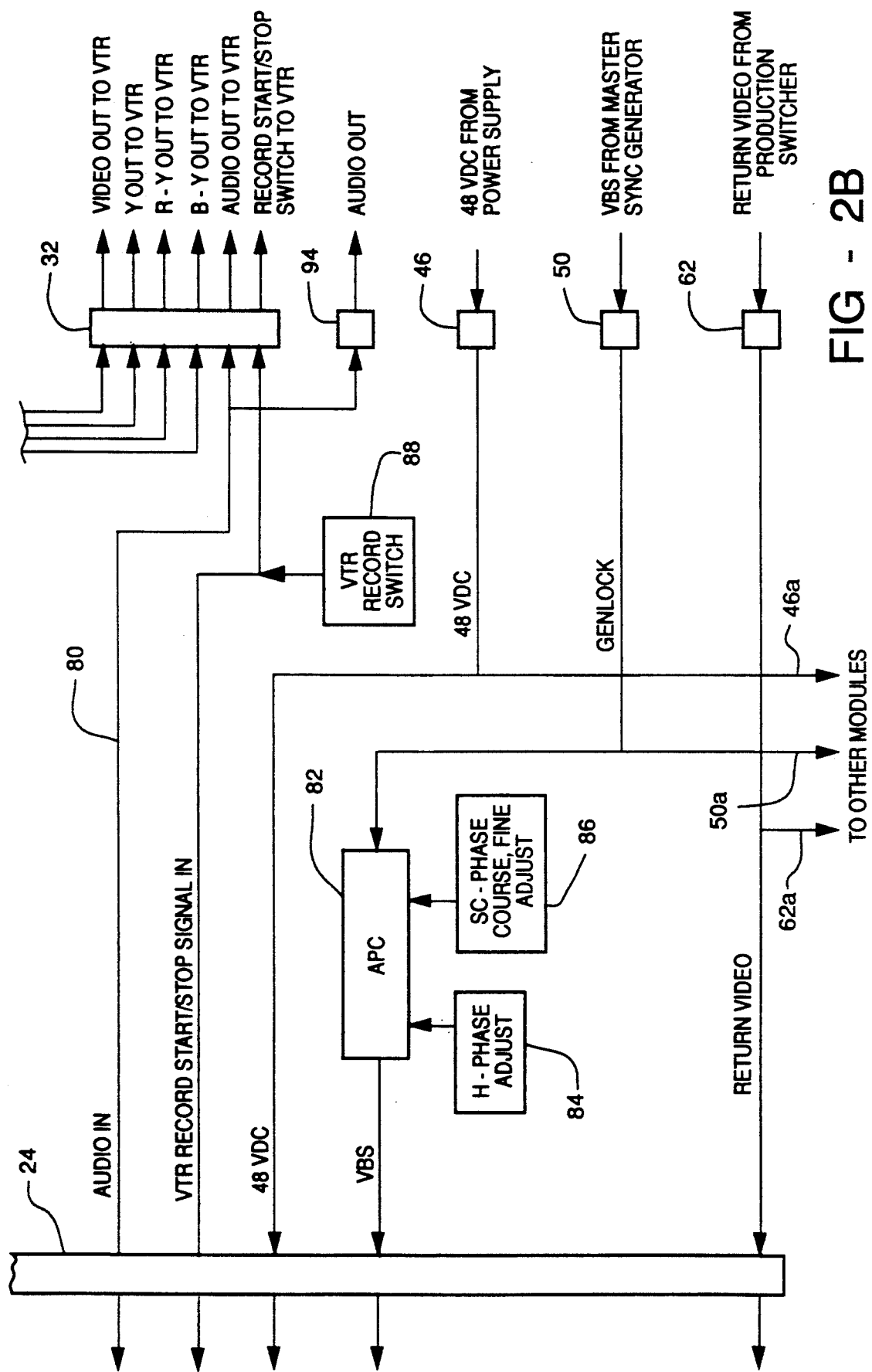

Turning now to FIG. 2, there is shown a schematic diagram of the electrical components and wiring contained within a module 16. All of the wires on the left side of FIG. 2 connect to the camera through connecter 24 via cable 28 and adapter 30 of FIG. 1. Some signals are passed through module 16 with no changes, such as the intercom signal wiring 63, which is routed from connector 39 to camera connector 24. Another example is the camera integral microphone audio signal wiring 65, which travels along line 80 from the camera connector 24 to the VTR connector 32 and also to connector 94. Most of the modifications to signals passing through the module involve two sets of signals: the synchronizing signals transmitted to the camera, and the video signals returned from the camera. The synchronizing signals must be individually adjusted for any differences in the length of the camera cables and the internal circuitry of the various cameras, and the video signals require modification because they involve high frequencies which are reduced in amplitude in direct proportion to the distance traveled. In particular, video signals along lines 70 from the camera each feed a cable compensation unit 72 and an amplifier 74. Each of the four video signals shown, having been compensated and amplified is fed to a separate connecter 58 disposed on module 16 rear panel 26 for connection via lines 56 to production switcher 52 shown in FIG. 1.

The system has thus far been described with reference to composite and Y/R-Y/B-Y component video signals, but the present invention is not limited to this configuration, and indeed may take advantage of any standard or nonstandard video encoding scheme, whether adapted for 525 scan lines, 625, or high-definition schemes now being proposed. For example, although Y, R-Y and B-Y are the three components ordinarily generated by conventional NTSC-based cameras, the present invention also anticipates cables, connectors and circuitry for signals associated with the Y, I and Q axes normally used for encoding NTSC signals. Similarly, whereas Y, R-Y and B-Y signals are generally provided in conjunction with 625-line PAL and SECAM systems, it is also possible to accommodate signals associated with the Y, U, and V axes used for PAL encoding or the Y, $D_R$ and $D_B$ SECAM axes.

The present invention is also capable of using R, G and B component signals; although outmoded for most component video applications, the R/G/B system may be applicable to certain computer graphics applications. Finally, while it is not yet clear which standard will be adopted for high-definition TV systems, the present invention is not precluded from taking advantage of such systems as they become commercially practicable.

Even in all-digital camera systems the present invention should prove useful. The cable-compensation and amplification circuitry just described will improve the "squareness" of the serial-digital pulses, particularly over long distances. In an alternative embodiment, the system may further include a slice-and-regenerate circuit to reproduce the digital bit stream with the highest degree of accuracy. The timing adjustment function is performed automatically for digital inputs to a production switcher; effect, each input represents the storage of an entire video frame. A central master sync generator will also be required to interface with each camera to maintain overall synchronization.

Figure 3:
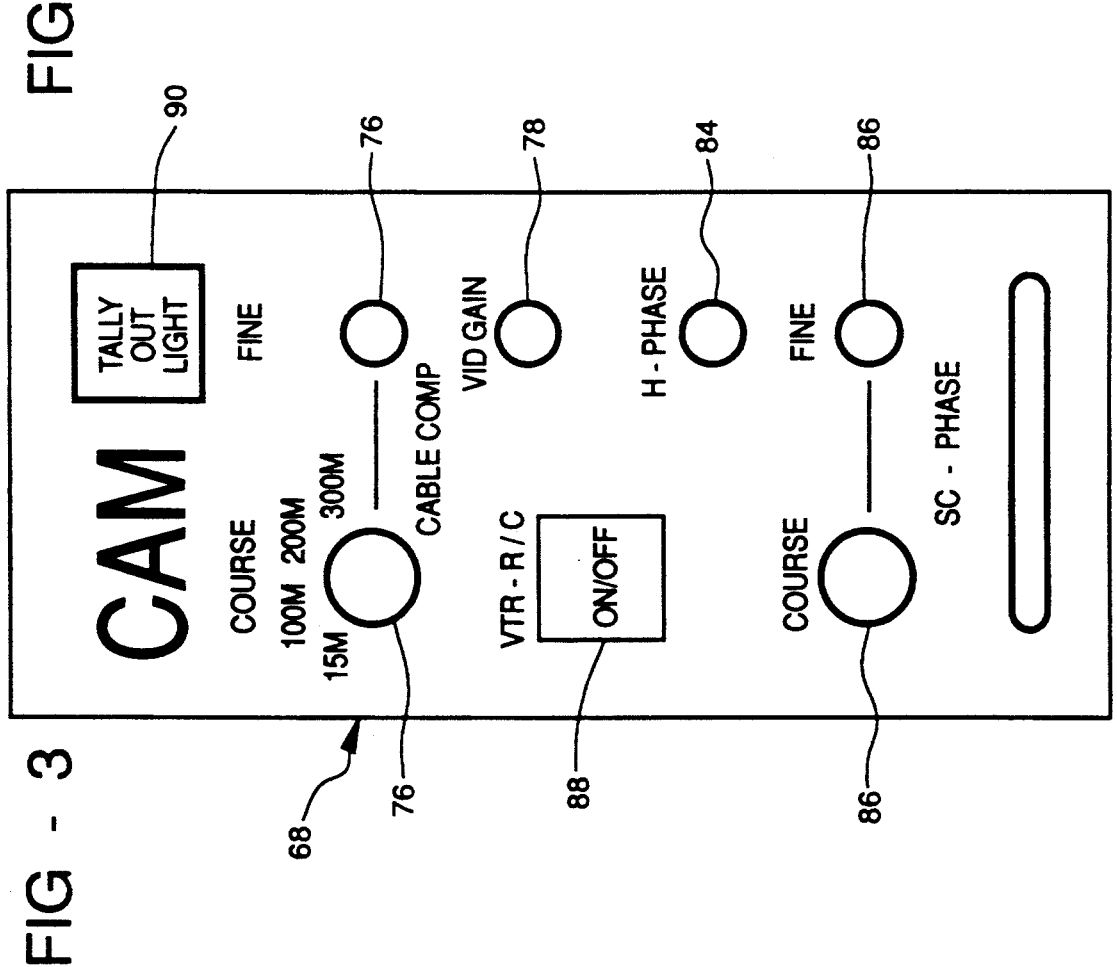
FIG. 3 is a drawing of the front panel to a module indicating the operator controls.

Controls associated with each cable compensation unit and amplifier are disposed on front panel 68 of module 16, those controls associated with cable compensation preferably including course and fine adjustment, shown in FIG. 3 at 76, and a gain adjustment 78, controlling each amplifier 74.

In the preferred embodiment, the actual circuitry performing the cable compensation 72 would rely upon commercially available transistors and wideband operational amplifiers, such as the MC1496 double-balanced modulator/demodulator. For the coarse adjustment, switched transistor/resistor/capacitor networks adjust the frequency response of the individual input video signals under control of the selector switch 76. For fine control, the double-balanced modulator/demodulator varies the high-frequency response under DC-voltage control. The amplification 74 is performed by straightforward transistor amplifiers feeding transistor output buffers.

Each compensated and amplified video signal is also routed to connecter 32 so that a video tape recorder 34 may be attached to record the incoming video signal. Audio is separately supplied to connecter 32 along line 80 from the camera via connecter 24, and VTR record switch 88 is preferably included on the module front panel, allowing an operator to activate and deactivate VTR 34.

Power from power supply 44, preferably 48 volts DC for powering camera, lens, and viewfinder/monitor, as well as for providing appropriate voltages to power the circuitry in the individual modules, enters the module along line 46 and is routed to the camera via connecter 24. A master synchronization or "GENLOCK" signal from the master sync generator enters the module along line 50 and provides an input to an electronic automatic phase control unit 82, having a horizontal phase adjustment 84 and subcarrier coarse and fine phase adjustments 86, controls 84 and 86 being disposed on the front panel of the module. The GENLOCK signal, having being so compensated, leaves APC unit 82 as a video black burst signal or VBS signal and is then routed out to the camera via connecter 24.

A return video signal from the production switcher enters the module along line 62 and is also relayed to the camera viewfinder/monitor via connecter 24. The common power supply signal along line 46, the master synchronization signal along line 50 and the return video signal 62 from the production switcher are each fed to other modules along lines 46a, 50a and 62a, respectively. As a convenience, the camera "tally-out" light 90 is provided on the front panel of the module to indicate when the camera associated with that module has been selected by the production switcher, by way of "tally-in" connector 92.

In operation, the operator of the system installs a module for each camera to be used, makes all appropriate connections to the rear panel of the module and, after energizing the system and all related equipment, utilizes the controls provided on the front panel of the module as shown in FIG. 3. Two separate APC adjustments are provided on the front panel of the module, one set for horizontal phase adjustment at 84, and one set, with coarse and fine adjustments, for the subcarrier phase at 86. When using an oscilloscope, these provisions make it a simple procedure to perform the precision timing synchronization adjustments required for switching and combining signals from the multiple signal sources utilized.

The separate cable compensation circuits 72 in FIG. 2 are adjusted by coarse and fine front panel controls shown at 76 in FIG. 3. Preferably, the coarse adjustment has markings to indicate general cable length of 15/100/200/300 meters, and, having set a general distance the fine tuning control to the right of the coarse control is then set. The gain for each of the amplifiers 74 in FIG. 2 may then be controlled with adjustment 78. VTR record start/stop switch is indicated at position 88.

Figure 4:
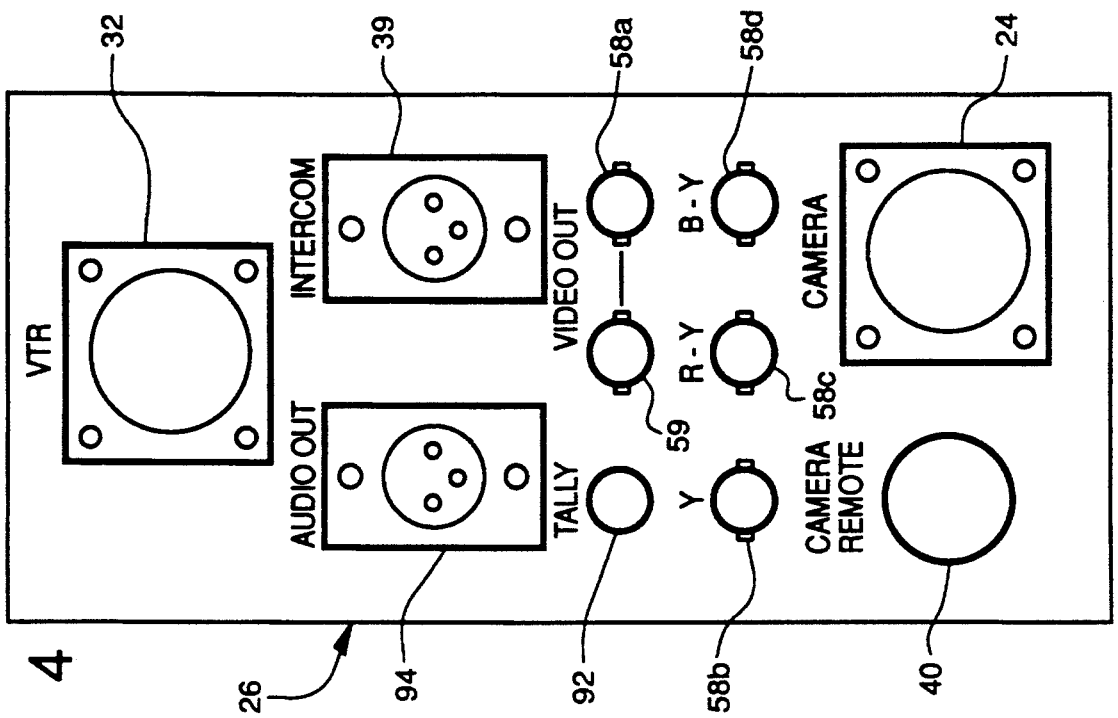
FIG. 4 is a drawing of the rear panel of a module showing the connectors thereon provided.

FIG. 4 is a drawing used to show the position of the various connectors disposed on the rear panel of each module. In the preferred configuration, the adjusted video signals from the camera are available both through the 26-pin industry standard "Betacam"-style connecter 32 as well as through individual BNC-type connecters at 58 for connection to the production switcher. Camera connecter 24 utilizes a similar multi-contact connecter to custom cable 28 and adapter 30 shown in FIG. 1. Intercom connecter 39 and audio out connector 94 utilize standard microphone-style jacks, and camera remote connecter 40 facilitates a custom interconnection via cable 42 customized for the remote-control unit supplied with the camera. Tally-out is available through connecter 90.

Thus the present invention fills an unsatisfied need for an economical "universal-type" of camera control unit for electronic field production. The system just described provides all of the features and capabilities of a full-specification professional camera control unit at a much lower cost. As an additional benefit, the power for both the camera and its supplied remote control unit is provided by a separate power supply through an interface module; in the normal configuration, the camera must be equipped with internal batteries, which have a limited life between recharging periods to power both the camera and the remote controller, which results in heavier equipment and increased operator fatigue. Furthermore, by utilizing interchangeable system components and integrating ENG-type controllers as opposed to resorting to much more expensive studio-type camera control units, the system of the present invention is protected from obsolescence when any one camera or other system component is replaced.

I claim:

1. A video field-production camera control system adapted for use in conjunction with equipment of varying configuration, including a master sync generator operative to generate a master synchronization signal, a production switcher unit operative to provide a program video-out signal by selecting among video input signals, and video cameras, including cameras that utilize cable remote-control units, the control system comprising:

a mounting frame upon which said sync generator and said switcher unit may be mounted;
a power supply disposed on said frame;
a central control unit disposed on said frame and connected to the power supply, sync generator and production switcher, the control unit being adapted to accept a plurality of interface modules for installation therein, each module being connected through a cable to an adapter interfaced to a video camera to be used with the system, and each module being operative to:
route power from the power supply to the camera through the adapter;
adjust the phase of said master synchronization signal in accordance with an operator control and route the adjusted synchronization signal to the camera through the adapter; and
receive at least one composite or component video signal from the camera through the adapter, adjust for cable frequency compensation and gain in accordance with an operator control, and route the adjusted video signal to said production switcher.

2. The video field-production control system of claim 1 wherein a plurality of component video signals are received by each module from the adapter connected thereto.

3. The video field-production control system of claim 1 wherein said adapter is further operative to derive a voltage required to operate said camera from the voltage supplied by said power supply.

4. The video field-production control system of claim 1 wherein the operator control in each interface module associated with adjusting the phase of said master synchronization signal provides for horizontal phase adjustment and subcarrier phase adjustment.

5. The video field-production control system of claim 1 wherein each interface module further includes a tally lamp connected to a tally-in signal from the production switcher and wherein said module further provides a tally-out signal to the camera through the adapter, the lamp being illuminated and the tally-out signal being asserted when the camera associated with said interface module has been selected.

6. The video field-production control system of claim 1 wherein each interface module further includes a VTR record start/stop switch connected to a record start/stop signal from the camera through the adapter, said switch being operative to activate and de-activate a video tape recorder dedicated to the camera associated with each module.

7. A video field-production control system adapted for use in conjunction with related equipment of varying configuration, including a master sync generator operative to generate a master synchronization signal, a production switcher unit operative to provide a program video out signal by selecting among video input signals and cable-remote-controlled video cameras, the control system comprising:

a framework having installed thereon a power supply, said master sync generator, said production switcher, and a plurality of interface modules, each being connected to the power supply, sync generator and production switcher, and each module including:

a chassis with a panel having disposed thereon a plurality of connectors, including a camera connector, a remote connector and video-out connectors;

an adapter and camera cable used to connect a video camera to the camera connector, thereby enabling said cable to carry power, synchronization and control signals to the camera and video, audio and status signals from the camera to said module;

operator-adjustable cable-compensation circuitry disposed on said chassis and connected to said camera connector, said cable-compensation circuitry being operative to allow an operator to compensate each video signal from said camera in accordance with the length of said camera cable;

operator-adjustable amplification circuitry disposed on said chassis and connected between said cable-compensation circuitry and said video-out connectors, said amplification circuitry being operative to allow an operator to adjust the gain of each video signal;

operator-controlled phase-adjustment circuitry disposed on said chassis and connected between said master sync generator and said camera connector, said phase-adjustment circuitry being operative to allow an operator to adjust the phase of the synchronization signal delivered to said camera; and a remote cable adapted to be connected between said remote connector and said remote unit, if supplied.

8. The video field production control system of claim 7 wherein said adapter further includes voltage regulation circuitry adapted to receive the output of said power supply through said camera cable and generate therefrom a voltage required to operate said camera.

9. The video field production control system of claim 7 wherein said video-out connectors include connectors for composite video and connectors associated with a component video standard.

10. A video field-production control system adapted for use in conjunction with equipment of varying configuration, including cable-remote-controlled video cameras, video tape recorders, sync generators of the type that provide a GENLOCK signal, and production video switchers operative, under user control, to provide a video-out signal by choosing among video-in signals, the control system comprising:

a framework having installed thereon said sync generator, said production switcher, a power supply operative to supply a DC voltage, and a central control unit connected to the power supply, sync generator and production switcher, the control unit being adapted to accommodate a plurality of interface modules for installation therein, each module including:

a chassis with a panel having disposed thereon a plurality of connectors, including a camera connector, a remote connector, a composite video-out connector, and component video-out connectors;

an adapter and camera cable used to connect a camera to the camera connector disposed on said module, thereby enabling the cable to carry power, synchronization and control signals to the camera and video, audio and status signals from the camera to said module, the adapter being operative to derive ally voltages necessary to operate the camera;

operator-adjustable cable-compensation circuitry disposed on said chassis and connected to said camera connector, said cable-compensation circuitry being operative to allow an operator to compensate each video signal carried by said camera cable in accordance with the-length of said cable;

operator-adjustable amplification circuitry disposed on said chassis and connected between said cable-compensation circuitry and said composite and said component video-out connectors, said amplification circuitry being operative to allow an operator to adjust the gain of each signal associated therewith;

operator-controlled phase-adjustment circuitry disposed on said chassis and connected between said master sync generator and said camera connector, said phase-adjustment circuitry being operative to allow an operator to adjust the horizontal phase and sub-carrier phase of the GENLOCK signal prior to its delivery to said camera.

a remote cable adapted to be connected between said remote connector and said remote unit.

11. The video field-production control system of claim 10 wherein said remote unit is of the electronic news gathering (ENG) type.

12. The video field-production control system of claim 10 wherein the voltage supplied by .said power supply is greater than 12 volts DC.

13. The video field-production control system of claim 10 wherein said adapter is capable of deriving both positive and negative voltages required to operate said camera.

14. The video field-production control system of claim 10 wherein the panel on each module chassis has further disposed thereon an intercom connector connected to said camera connector, thereby enabling an operator to communicate with the operator of the camera connected to that module.

15. The video field-production control system of claim 10 wherein each interface module further includes a tally lamp connected to a tally-in signal from the production switcher and wherein said module further provides a tally-out signal to the camera through the adapter, the lamp being illuminated and the tally-out signal being asserted when the camera associated with said interface module has been selected.

16. The video field-production control system of claim 10 wherein the panel on each module chassis has further disposed thereon a VTR connector connected to an output of said amplification circuitry, thereby enabling a video cassette recorder attached to said VTR connector to record a video signal produced by the camera connected to that module.

17. The video field-production control system of claim 16 wherein each interface module further includes a VTR record start/stop switch connected to a record start/stop signal from the camera through the adapter, said switch being operative to activate and de-activate said video tape recorder.

* * * * *

UNITED STATES PATENT AND TRADEMARK OFFICE
CERTIFICATE OF CORRECTION

PATENT NO. : 5,325,202
DATED : June 28, 1994
INVENTOR(S) : Washino

It is certified that error appears in the above-indentified patent and that said Letters Patent is hereby corrected as shown below:

Column 4, line 48, delete "effect" and insert --in effect--;

Column 8, line 38, delete "ally" and insert --any--;

Column 8, line 45, delete "the- length" and insert --the length--.

Signed and Sealed this

Eleventh Day of October, 1994

Attest:

BRUCE LEHMAN

*Attesting Officer*     *Commissioner of Patents and Trademarks*